United States Patent [19]

Ihle et al.

[11] Patent Number: 5,372,844
[45] Date of Patent: Dec. 13, 1994

[54] PROCESS AND DEVICE OF APPLYING MULTI-COMPONENT RESINS AND USE OF SAME

[75] Inventors: Clausdieter Ihle, Müllheim; Volker Banhardt, Sulzburg, both of Germany

[73] Assignee: Koch Marmorit GmbH, Bollschweil, Germany

[21] Appl. No.: 917,033

[22] PCT Filed: Nov. 23, 1990

[86] PCT No.: PCT/EP90/02007

§ 371 Date: Jul. 31, 1992

§ 102(e) Date: Jul. 31, 1992

[87] PCT Pub. No.: WO91/08056

PCT Pub. Date: Jun. 13, 1991

[30] Foreign Application Priority Data

| Dec. 2, 1989 | [DE] | Germany | 3939981 |
| Dec. 13, 1989 | [DE] | Germany | 3941142 |
| Dec. 13, 1989 | [DE] | Germany | 3941142 |
| May 7, 1990 | [DE] | Germany | 4014529 |
| Jul. 25, 1990 | [DE] | Germany | 4023541 |

[51] Int. Cl.$^5$ .................. B05B 7/04; E01B 1/00
[52] U.S. Cl. .................. 427/136; 427/420; 239/427.5; 239/428; 239/432
[58] Field of Search .............. 427/136, 420; 239/432, 239/428, 427.3, 427.5, 8, 599

[56] References Cited

U.S. PATENT DOCUMENTS

| 3,795,364 | 3/1974 | Kattner | 239/432 |
| 4,186,256 | 1/1980 | Geise | 239/428 |
| 4,236,674 | 12/1980 | Dixon | 239/599 |
| 4,339,078 | 7/1982 | Ford et al. | 239/432 |
| 4,761,299 | 8/1988 | Hufstetter et al. | 118/629 |
| 5,180,104 | 1/1993 | Mellette | 239/599 |

FOREIGN PATENT DOCUMENTS

| 380412 | 5/1986 | Austria . |
| 0180118 | 5/1986 | European Pat. Off. . |
| 3200861 | 7/1983 | Germany . |
| 3527829 | 2/1987 | Germany . |
| 655526 | 4/1986 | Switzerland . |
| 9006290 | 6/1990 | WIPO . |

*Primary Examiner*—Shrive Beck
*Assistant Examiner*—Katherine A. Bareford
*Attorney, Agent, or Firm*—Wegner, Cantor, Mueller & Player

[57] ABSTRACT

In the process of the invention, multi-component resins are applied to porous, granular materials intended for subsequent consolidation. Application is carried out by feeding the components, physically separated from each other, under relatively high pressure, to a mixing chamber, mixing them by turbulent means in the mixing chamber, and applying the resulting mixture, at relatively low pressure, as a thin curtain in laminar flow to the material. The simplest form of the device of the invention comprises: a) separate feed lines for the components at relatively high pressure; b) a mixing chamber preferably designed as a static mixer; c) a fan spray nozzle working at relatively low pressure. The process and device are used to increase the sound-absorption and/or ease-of-cleaning characteristics of a railway tracks, to increase the cross-sliding resistance of railway sleepers on ballast, and to smooth the transition between a soft and hard railway track.

13 Claims, 2 Drawing Sheets

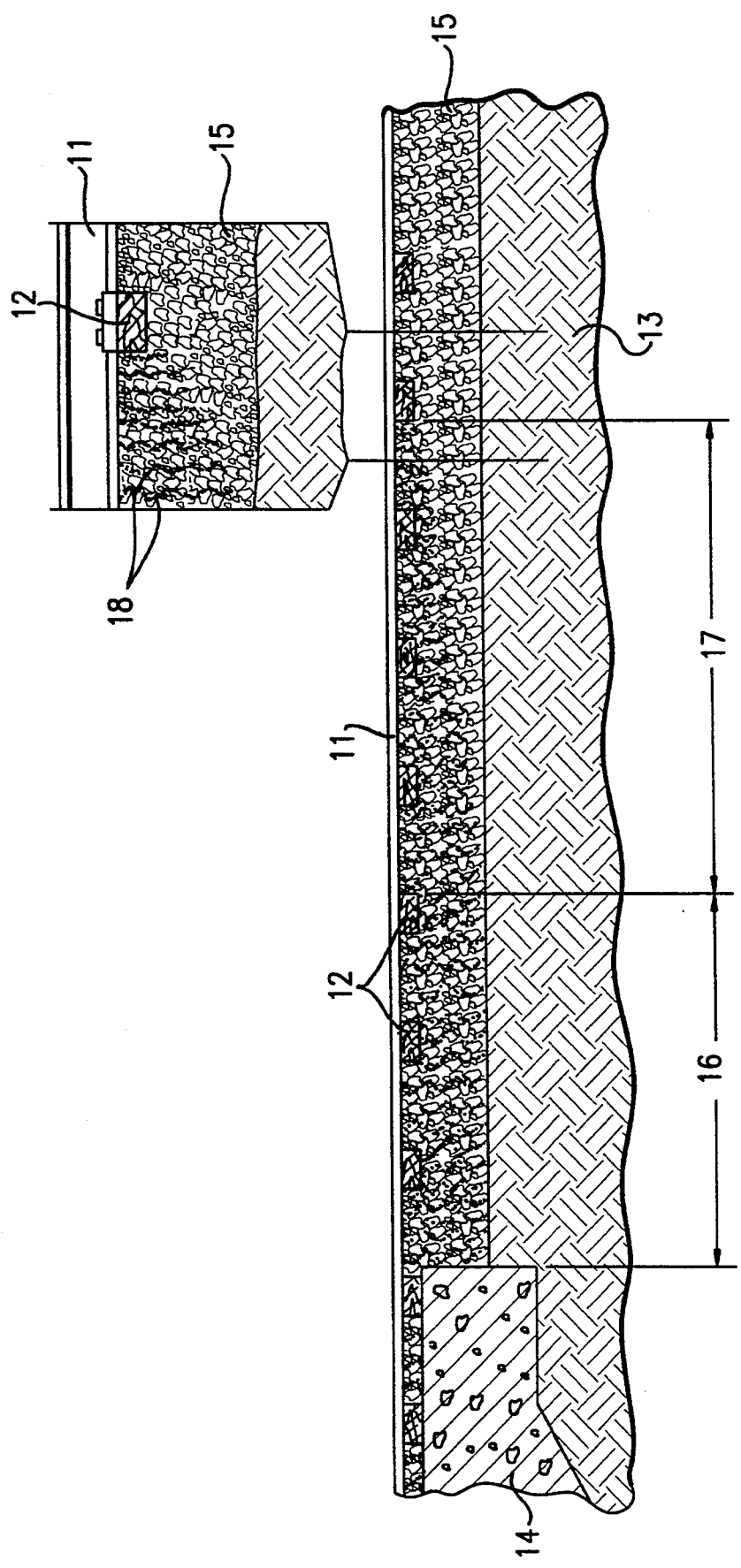

PROCESS AND DEVICE OF APPLYING MULTI-COMPONENT RESINS AND USE OF SAME

This application is a national stage application of PCT/EP90/02007.

FIELD OF THE INVENTION

Subject matter of the present invention is a process and a device for applying multi-component resins to porous, granular material to be compacted, in particular, bulk material to be compacted, optionally subsequently densified by rapping, etc. Typical such materials are, for example, ballasts for rail vehicles, additional stone bottomings finer in grain on such ballasts, but also sand and pebble bottomings for road construction to be cemented together without losing their water permeability.

BACKGROUND OF THE INVENTION

With ballasts for rail vehicles, cementing is effected particularly in the transition zones between soft and hard areas according to Applicant's German Patent Application P 39 41 141.9. According to Applicant's German Patent Application P 40 14 529.8, it may further be purposeful, particularly in curves, to increase the cross-sliding resistance of railway sleepers on ballast. According to Applicant's German Patent Application P 39 41 142.7, bottomings finer in grain on such ballasts are cemented using multi-component resins to increase sound absorption and/or cleanability of a railway track. In particular, cementing of pebbles and sand, with water permeability and porosity being retained, are performed to ensure rapid drainage of surface water, and thereby to reduce traffic noise even in rain.

In all these cases, as well as in similar fields of application for cementing porous granular material and bulk material using multi-component resins, it is required to apply a sufficient amount of said multi-component resins as uniformly as possible such that, at least in the upper region, the pasts are wetted over the total area, and adhesive bridges are formed at least at the contact points. Any excess amount of multi-component resin is to flow off downward and to coat further material there. By no means are the voids to be filled, as this would impede porosity of the cemented bulk material as well as its permeability for water and other liquids. Thus, the multi-component resins should not be too highly viscous and, if possible, not thixotropic. The setting reaction is to occur only after a sufficient depth of the bulk material layer is coated with the multi-component resin but not filled up to total volume. Since multi-component resins generally are very reactive substances possibly leading to irritation of skin and mucosae when processed, formation of spray mists should be suppressed or completely avoided. Moreover, processing in tunnels or in closed spaces should be performed without using solvents. In principle, this requirement also holds in open air since solvents evaporating immediately or subsequently result in an environmental burden to be avoided if ever possible. Nevertheless, the multi-component resins must be applicable rapidly, simply, and safely to keep material and wage expenses as low as possible.

SUMMARY OF THE INVENTION

This ambivalent, difficult, and partially contradictory problem can be solved in a surprisingly simple manner in that the components, physically separated from each other, at relatively high pressure, are fed to a mixing chamber, mixed by turbulent means in the mixing chamber, and applied as mixture at relatively low pressure as thin curtain in laminar flow to the material.

Preferably, by selecting components and, optionally, suitable additives, there is provided that viscosity of the mixture is increased to from 300 to 1000 mPas, but the surface tension is decreased. These two properties make contributions in that the thin curtain of the mixture does not break up too early, thus forming spray mists.

Here, components and additives should be free of solvents to begin with. Further, addition of solvents should be abandoned completely.

Fan spray nozzles operating at relatively low pressure are particularly suited in generating a thin curtain of mixture emerging in laminar flow. Suitable fan spray nozzles are offered, for example, by the company Spraying Systems Deutschland GmbH, Hamburg, under the designation FlatJet, nozzles and FloodJet, nozzles. When using common low-viscosity materials such as water and aqueous flushing solutions, these fan spray nozzles provide a thin curtain of fine droplets including a considerable amount of spray mists. Initially, it was not predictable that it is possible to discharge multi-component resins using said fan spray nozzles in such a way that the resulting curtain does not break up too early and does not form spray mists. In particular, if a pressure of only between 2 and 6 bars (preferably from 3.5 to 5 bars) is present when the mixture emerges from the nozzle, a thin curtain of the mixture in laminar flow results. This curtain generally remains intact over at least 10, mostly 20 cm, and only then is divided into single jets and, eventually, into relatively large drops, but in no case into the spray mists to be avoided.

Prior to discharge from the fan spray nozzle, the individual components of the multi-component resin must be mixed as quickly and intensively as possible, with the amount of each mixture produced to be kept as small as possible to keep losses of material upon interruption of operation as low as possible. Thus, according to the invention, the components must be mixed together turbulently in the mixing chamber. Static mixers have especially proven valuable. These are relatively short pipes having successive left-handed and right-handed helix, thereby providing turbulent flow and perfect mixing of the components.

According to the invention, the feed lines for the individual components to the static mixer must be under relatively high pressure. Pressures between 30 and 200 bars (preferably from 50 to 150 bars) have proven suitable. This relatively high pressure is diminished so far within the static mixer that the final mixture emerges from the fan spray nozzle at a residual pressure of only from 2 to 6 bars.

The residence times of the multi-component resin in the mixing chamber or the static mixer are substantially shorter than the so-called pot life of the final mixtures. Thus, the mixture applied to the bulk material in a fashion according to the invention retains its relatively low viscosity for a time sufficient to spreadingly and wettingly pass a sufficiently thick layer of bulk material.

By no means however, may the components of the multi-component resins be allowed to come into contact within from the pipelines up to the mixing chamber or even to react within the feed lines. Thus, it is convenient to secure each of the separate feed lines for the components by check valves. Furthermore, it is most convenient to connect each of these feed lines separately to a compressed-air line which in turn is secured by check valves. Preferably, check valves are provided at both the beginning and end of each feed line for the components as well as in the compressed air lines. In case one component is stopped or the feed of one component is interrupted on purpose or unintentionally, the compressed air provides for discharge of the feed line to the mixing chamber and from there to the fan spray nozzle. After a short time, a thin curtain of a liquid-air mixture will emerge there which immediately can be observed both optically and acoustically and should result in interruption of the overall processing operation.

Pipelines and mixing chamber are also cleaned by compressed air upon intentional interruption or completion of the processing operation. Further cleaning with solvents is not required in general.

Thus, object of the present invention is, first, the process according to the claims to the above process. Another object of the present invention is the device for performing said process, consisting of
 a) separate feed lines for the components being under relatively high pressure;
 b) a mixing chamber, preferably designed as a static mixer;
 c) a fan spray nozzle for relatively low pressure;
 d) preferably separate compressed-air lines leading to the feed lines for the components; and
 e) check valves provided at both beginning and end of each feed line for the components as well as in the compressed-air lines.

Thus, in the simplest case, the device consists of separate feed lines for the components being under relatively high pressure, a mixing chamber and a fan spray nozzle for relatively low pressure. Preferably, the device has separate compressed-air lines leading to the feed lines for the components. Conveniently, each of the feed lines for the components and the compressed-air lines are secured by check valves, so that unintentional penetration of one or all the components into parts of the device other than the mixing chamber and fan spray nozzle are avoided.

When using static mixers, the device can be handled relatively simply and easily, and thus, manual handling works quite well. The feed of the device is preferably effected using flexible tubes. Thus, with a two-component resin, two tubes for the components and one tube for compressed air are sufficient.

Preferred multi-component resins are epoxide resin adhesives as well as polyurethane resin adhesives. For special uses, a third or a fourth liquid component may be dosed readily, particularly, where surface tension, viscosity, and reaction time are to be adjusted to each special situation, or these additional components on premixing give rise to decreasing stability of the major components.

Further additional components may be flame retardants, defoamers, suspensions of color pigments, etc., intended to be used in certain places or especially critical areas only.

BRIEF DESCRIPTION OF THE DRAWINGS

FIG. 2 shows a railway track laid over the ballast which has been sprayed with the adhesive of the present invention.

DETAILED DESCRIPTION OF THE INVENTION

Figure 1:
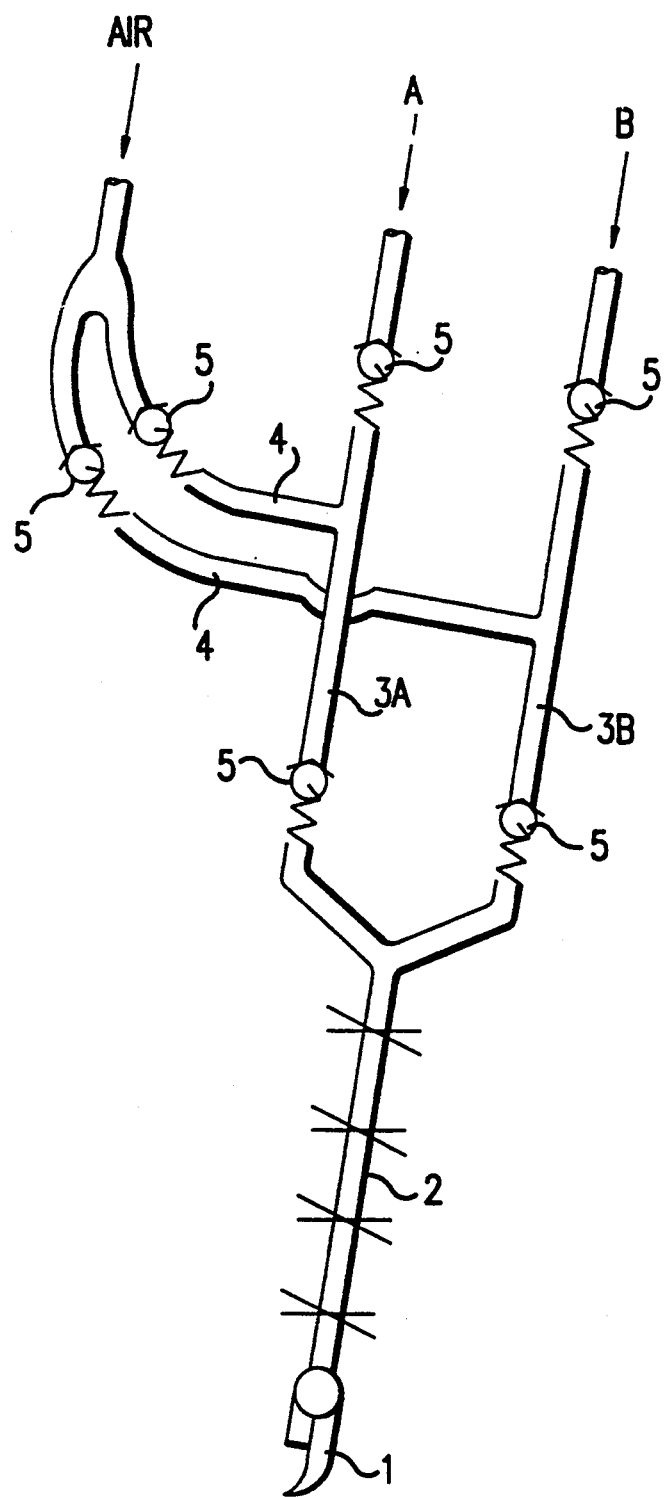
FIG. 1 is a schematic diagram of a device for applying a two-component resin.

In attached FIG. 1, there is represented schematically a device according to the invention for applying a two-component resin having components A and B.

In this figure,
 1 represents a fan spray nozzle
 2 represents a static mixer
 3A represents the feed line for component A
 3B represents the feed line for component B
 4 represents the separate feed lines for compressed air
 5 represents the check valves in the feed lines for the components and the feed lines for compressed air.

Further objects of the invention are utilizations of this process and device for the application of multi-component resins
 a) to increase sound absorption and/or cleanability of a railway track, where a stone bottoming ranging in grain size below 63 mm, preferably below 30 mm diameter is applied onto the railway track and is compacted by spraying with a spreading multi-component epoxide resin adhesive;
 b) to increase cross-sliding resistance of railway sleepers on ballast, where the ballast is sprayed with a spreading multi-component epoxide resin adhesive or a multi-component polyurethane resin adhesive;
 c) to smoothen the transition between a soft and a hard railway track, where the soft track succeeding the end of the hard track is compacted by spraying with a spreading multi-component epoxide resin adhesive or a multi-component polyurethane resin adhesive, and the compacting is effected decreasingly with increasing distance from the hard track by decreasing the amount of adhesive applied; and
 d) to cement pebbles and sand in road construction, with water permeability and porosity being retained.

To increase sound absorption and/or cleanability of a railway track, the stone bottoming ranging in grain size below 63 mm, preferably below 30 mm diameter is applied onto the railway track and is compacted by spraying with a spreading multi-component epoxide resin adhesive.

Due to the narrow range in grain size, the layer formed according to this process has a relatively high amount of voids, but is, nevertheless, compacted, because the spreading adhesive moves around the grains, thus always reaching the contact points of the grains, binding them together after curing, but in advance, optionally, flowing downward to the next grain, etc.—steadily moving along the grain surface, and not filling the voids. Important in this connection is the range in grain size—preferably below 25 mm, more preferably below 20 mm—being far below that of ballast usually present, and which, depending on whether sound absorption or cleanability is deemed more desirable, more one way or the other, may be uniformly selected to serve both functions as well.

As a rule, the range in grain size will be limited to a grain size ratio of from 1:2 to 1:3 (smallest grain to largest grain). Grainings of from 2 to 4 mm, from 4 to 11 mm, and from 8 to 16 mm have proven convenient.

Likewise, the stone bottoming may be applied several times in different layers. Here, if grain size increases from bottom to top, sound absorption is improved. The sound will be forced to branch on its way downwards and fades away.

The stone bottoming may consist of round grains or stone chips.

The layer is to serve sound absorption predominantly on and in buildings, as well as on bridges and in tunnels, particularly on solid road, i.e., where railways are laid onto concrete. The layer is to serve cleanability predominantly in railway stations. The firmness of the layer surface—the depth of compacting may be controlled by amount of spray-applied adhesive—permits, for example, cleaning by steam jet blowing and simultaneous suction.

It is an important advantage that the layer produced according to the invention is drainable. This is not the case with prior known layers made of concrete or steel.

Another advantage is that it is possible to break up the layer for purposes of repair, e.g., at a sleeper, and then to restore it using the same stone material. It is noted that, as a rule, the layer extends as high as the upper edge of the sleeper. It also protects from stones flying about.

Using the following embodiment, this application is explained in greater detail:

A threefold stone bottoming is applied to a track embankment, depending on the conditions, to a total thickness of from 20 to 25 cm. The bottom layer consists of quartz graining (round grain), grain size from 2 to 4 mm, the middle layer consists of stone chip graining (basalt or limestone), grain size of from 4 to 11 mm, and the top layer consists of stone chip graining (basalt or limestone), grain size of from 8 to 16 mm. The bottom and middle layer each make up about 30%, the top layer for about 40% of the total thickness.

Thereupon is sprayed an epoxide resin adhesive in an amount of, for example, 2 kg/m2.

The adhesive is a two-component adhesive.

The resin component consists of non-brominated bisphenol A resins and cycloaliphatic resins. Added thereto are monofunctional and/or bifunctional reactive thinners, phosphoric esters as flame retardants, silicic acid esters as primers, and a silicone defoamer.

The hardener component consists of adducts of amines, amides, phenol-free Mannich bases or mixtures thereof, benzyl alcohol as promoter, silicic acid ester as primer, and silicone defoamer.

The adhesive forms a uniformly compacted layer down to a depth of about 10 cm. Beneath, the compacting is more loose, and then is only present here and there.

In addition to the weight of the trains, a centrifugal force acts upon the railway tracks in curves. The transverse force thus acting upon the sleepers may be neutralized for a certain train velocity by banking the outward track. As a rule, however, the railways must be run by trains having different velocities. To provide for slow freight trains, banking is limited.

To increase cross-sliding resistance of railway sleepers on ballast, the latter is sprayed with a spreading multi-component epoxide resin adhesive or a multi-component polyurethane resin adhesive.

The spreading adhesive moves around the crushed stones, thus always reaching the contact points of the stones, binding them together after curing, but in advance, optionally, flowing downward to the next stone, etc.—steadily moving along the stone surface, and not filling the voids. The adhesive, uniformly spread by spraying, continuously compacts a flat surface layer of the ballast, forming stalactites thereunder. With larger amounts of adhesive, these stalactites are formed in somewhat smaller distances to each other. In part, they reach down as far as to the bottom of the ballast, forming an additional toe there. Decreasing the amount of adhesive results in greater distance and diminished lengths of the stalactites. Thus, using the amount of adhesive applied, controlled compacting of the ballast may be achieved. The railway sleepers embedded into the ballast are accordingly held more strongly.

The hold still improves when the railway sleepers are sprayed as well, thus gaining the same binding with the ballast as the ballast within itself.

The amount of adhesive to be applied depends on the conditions present. As a general rule, it will be more than 2 l/m2, mostly between 5 and 8 l/m2.

An example for an adhesive to be applied is given as follows:

The resin component consists of non-brominated bisphenol A resins and cycloaliphatic resins. Added thereto are monofunctional and/or bifunctional reactive thinners, phosphoric esters as flame retardants, silicic acid esters as primers, and a silicone defoamer.

The hardener component consists of adducts of amines, amides, phenol-free Mannich bases or mixtures thereof, benzyl alcohol as promoter, silicic acid ester as primer, and silicone defoamer. Likewise, a multi-component polyurethane resin adhesive would be possible instead.

The adhesive is incorporated in an amount of from 6 to 7 kg/m2, for instance.

A special advantage is that also existing railway lines may be improved in simple fashion by the process according to the invention.

A soft railway is understood to be railway tracks laid onto ballast, and a hard railway is understood to be railway tracks laid onto or into a built structure which, as a rule, is made of concrete. The ballast is more flexible than concrete. With 20 t of weight on the axle, the tracks give way for about from 1.5 to 4 mm, mostly about 3 mm, on concrete, for only from 0.5 to 1.5 mm, mostly about 1 mm, which is due to the plastic layer between concrete and tracks.

This difference gives rise to an impact or shock, as the wheels make the transition from one railway track to the other.

To smooth the transition between a soft and a hard railway track, the soft track succeeding the end of the hard track is compacted by spraying with a spreading multi-component epoxide resin adhesive or a multi-component polyurethane resin adhesive, and the compacting is effected decreasingly with increasing distance from the hard track by decreasing the amount of adhesive applied.

Preferably, the compacting initially is performed continuously for some way, and then, decreasingly.

The spreading adhesive moves around the crushed stones, thus always reaching the contact points of the stones, binding them together after curing, but in advance, optionally, flowing downward to the next stone, etc.—steadily moving along the stone surface, and not filling the voids. The invention includes the recognition that such compacting may be controlled very well by the amount of adhesive applied, to a large degree by local distribution of the adhesive. The adhesive, uniformly spread by spraying, continuously compacts a flat surface layer of the ballast, forming stalactites thereunder. With larger amounts of adhesive, these stalactites are formed in somewhat smaller distances to each other. In part, they reach down as far as to the bottom of the ballast, forming an additional toe there. Decreasing the amount of adhesive results in a greater distance and diminished lengths of the stalactites.

In this way, a kind of point lattice forms as a monolithic block, which lattice, depending on its density, holds together the ballast to a greater or lesser extent, and, depending on its depth extension, in a flatter or higher layer, thus more or less decreasing the low mobility of the ballast stones with respect to each other, and thus decreasing ballast flexibility.

In addition to the reversible mobility of the ballast stones in elastic deformation, the irreversible displacements of the ballast stones with respect to each other, occurring in the course of time, are reduced, which cause the ballast to give way and thus, further result in shock at the transition from soft to hard track way and vice versa.

For instance, the section of constant stability has a length of from 5 to 15 m, the section of decreasing stability, for example, has a length of from 10 to 20 m.

Depending on its composition, the adhesive will be applied in an amount of from 5 to 8 l/m2 which reduces to from 1 to 2 l/m2.

FIG. 2 represents an embodiment of the invention. It shows a vertical longitudinal section of a railway track, a sector being drawn in magnification.

A railway track having rails 11 on sleepers 12 is running from natural ground onto a bridge 14. Above the natural ground the sleepers 12 are carried on ballast 15. On the bridge 14, they lie directly on concrete.

By spraying an adhesive penetrating the ballast onto a section 16 succeeding the bridge 14 of, e.g., 10 m in length and then onto a section 17 of, e.g., 15 m in length, the ballast 15 is compacted in a uniform and decreasing manner, respectively. The decrease in compacting results in the first place from a decreasing average penetration depth of the adhesive. Another small proportion of said decrease is due to greater distance between the points where the adhesive extends downwards in the form of stalactites 18.

The adhesive is a two-component adhesive.

The resin component consists, for instance, of non-brominated bisphenol A resins and cycloaliphatic resins. Added thereto are monofunctional and/or bifunctional reactive thinners, phosphoric esters as flame retardants, silicic acid esters as primers, and a silicone defoamer.

The hardener component consists of adducts of amines, amides, phenol-free Mannich bases or mixtures thereof, benzyl alcohol as promoter, silicic acid ester as primer, and silicone defoamer. Likewise, a multi-component polyurethane resin adhesive were possible instead.

In section 16, the adhesive has been incorporated in an amount of from 6 to 7 kg/m2, and in section 17 uniformly decreasing to 1 kg/m2.

We claim:

1. A process for applying multi-component resins on to porous, granular material to be compacted, wherein the components, physically separated from each other, are fed into a mixing chamber at a pressure of from 30 to 200 bars, mixed by turbulent means in the mixing chamber, and the mixture is applied to the material at a pressure of from 2 to 6 bars in the form of a curtain in laminar flow upon the material.

2. The process according to claim 1, wherein break-up of curtain and formation of spray mists are prevented by additives decreasing surface tension and/or increasing the viscosity of the mixture.

3. Process according to claim 1, wherein no solvents are used.

4. Process according to claim 1, wherein a static mixer is used as the mixing chamber.

5. Process according to claim 1 wherein the components are fed into the mixing chamber by feed lines and each feed line for the components is separately secured by check valves and may be discharged via the mixing chamber by feeding compressed air.

6. The process according to claim 5, wherein when the feed of one component to the mixing chamber is stopped, a mixture of air and other component is discharged as a curtain of a liquid/air mixture.

7. Use of the process according to claim 1 for applying multi-component resins
   to increase sound absorption and/or cleanability of railway track, where a stone bottoming ranging in grain size below 63 mm is applied onto the railway track and is compacted by spraying with a spreading multi-component epoxide resin adhesive.

8. Use according to claim 7 wherein the stone bottoming has a grain size below 30 mm diameter.

9. Use of the process according to claim 1 for applying multi-component resins to increase cross-sliding resistance of railway sleepers on ballast, where the ballast is sprayed with a spreading multi-component epoxide resin adhesive or a multi-component polyurethane resin adhesive.

10. Use of the process according to claim 1 for applying multi-component resins to smooth a transition between a relatively soft and a relatively hard railway track, where the soft track succeeding an 2end of the hard track is compacted by spraying with a spreading multi-component epoxide resin adhesive or a multi-component polyurethane resin adhesive, and the compacting is effected decreasingly with increasing distance from the hard track by decreasing an amount of adhesive applied.

11. Use of the process according to claim 1 for applying multi-component resins to cement pebbles and sand in road construction, with water permeability and porosity being retained.

12. A device for applying multi-component resins on to a porous, granular material to be compacted, comprising
   a) separate feed lines for the components being under relatively high pressure;
   b) a mixing chamber said feed lines being connected to said mixing chamber;
   c) a fan spray nozzle for relatively low pressure said fan nozzle being connected to said mixing chamber;
   d) separate compressed-air lines leading to each feed line for the components; and
   e) check valves provided for each feed line for the components and for each compressed-air line.

13. A device according to claim 12 wherein the b) mixing chamber is a static mixer.

* * * * *